(12) United States Patent
Ingistov (10) Patent No.: US 6,226,975 B1
(45) Date of Patent: May 8, 2001

(54) TURBINE POWER PLANT HAVING A FLOATING BRUSH SEAL

(76) Inventor: Steven G. Ingistov, 7825 Anise Ave., Los Angeles, CA (US) 90045

( * ) Notice: Subject to any disclaimer, the term of this patent is extended or adjusted under 35 U.S.C. 154(b) by 0 days.

(21) Appl. No.: 09/395,518

(22) Filed: Sep. 14, 1999

(51) Int. Cl.$^7$ ........................................... F02C 7/28
(52) U.S. Cl. .................. 60/39.02; 60/39.75; 415/170.1; 415/174.3
(58) Field of Search ................ 60/39.02, 39.07, 60/39.75; 415/113, 170.1, 174.3

(56) References Cited

U.S. PATENT DOCUMENTS

| | | | |
|---|---|---|---|
| 4,979,755 | 12/1990 | Lebreton | 415/173.5 |
| 5,074,748 | * 12/1991 | Hagle | 415/170.1 |
| 5,205,706 | 4/1993 | Belcher | 415/170.1 |
| 5,335,920 | 8/1994 | Tseng et al. | 277/1 |
| 5,501,573 | 3/1996 | Sanders | 277/53 |
| 5,522,698 | 6/1996 | Butler et al. | 415/170.1 |
| 5,630,590 | 5/1997 | Bouchard et al. | 277/53 |
| 5,688,105 | 11/1997 | Hoffelner | 415/170.1 |
| 5,704,760 | 1/1998 | Bouchard et al. | 415/170.1 |
| 5,749,584 | 5/1998 | Skinner et al. | 277/53 |
| 5,961,279 | 10/1999 | Ingistov | 415/170.1 |

OTHER PUBLICATIONS

"Brush Seals" Directions Brochure; Pratt & Whitney, North Berwick, Maine; 2 pages; Sep., 1993.

* cited by examiner

Primary Examiner—Timothy S. Thorpe
Assistant Examiner—Ehud Gartenberg
(74) Attorney, Agent, or Firm—F. Lindsey Scott (57) ABSTRACT

A floating brush seal useful in a stationary gas turbine engine having a first rotary compressor component having a rotor having a land region, a second non-rotary component having an end extending over and around at least a portion of the land region with the floating brush seal being positioned between the first and the second component to substantially reduce the flow of air between the first and second component. A method for controlling the flow of cooling air into a chamber in the second component using the rotary brush seal is disclosed.

21 Claims, 5 Drawing Sheets

TURBINE POWER PLANT HAVING A FLOATING BRUSH SEAL

BACKGROUND OF THE INVENTION

1. Field of the Invention

The present invention relates to large, stationary turbine power plants and more particularly to a floating seal useful in large, stationary turbine power generators of the type used for utility services.

2. Description of the Prior Art

A typical stationary turbine power plant, known as Model Series 7001 simple cycle, single shaft, heavy duty gas turbine (Frame-7 machine), is available from General Electric of Schenectady, N.Y. In this and similar gas turbines, a seal is located between an axial compressor rotor and a stationary inner barrel member, a chamber within the inner barrel member being supplied with cooling air from the last stage of the compressor by a controlled amount of leakage through the seal. A set of shaft bearings is located in the chamber.

Leakage in excess of a predetermined amount that is required for cooling of the bearings becomes parasitic and contributes to inefficiency of the turbine power plant. This is a serious problem in turbine power plants of the prior art, in that the labyrinth seals, which are positioned to limit the air leakage, degrade in operation because of thermal expansions and other factors that cause knife-edge labyrinth seal members and adjacent rotating elements of the seals to be worn away quickly, particularly during shut-down sequences. This is caused, for example, by shrinkage of the inner barrel member being more rapid than shrinkage of the rotor at the seal. Thus, in the frame-7 machines, the bypass air flow may increase to approximately 100,000 lb/hr or higher from the 30,000 lb/hr that is considered optimal. Consequently, there is a loss of power that is believed to be between 1.5 MW and 3.0 MW.

Brush seals for aircraft gas-turbine engines are known, being disclosed, for example in "Brush Seals", *Directions*, September 1993. As disclosed therein, a brush seal consists of densely packed metallic bristles that are welded between a down-stream backing plate and an up-stream side plate. In a typical round seal for aircraft turbine applications, the plates are ring-shaped, the bristles extending radially inwardly at a trailing lay angle and making an interference contact with a rotor element, so that the bristles become curved and follow the rotor as it grows and shrinks during engine operation.

Brush seals have not been applied to existing large power plant turbines for a number of reasons. For example, the existing rotor components, being made from elements of low carbon steel alloys that are selected for certain thermal expansion properties, are believed to be unsuitable as wear surfaces for contact by the bristles, particularly during the extended operation cycles that are demanded of stationary power plants. Suitable hardening of applicable compressor rotor members is believed to be prohibitively expensive, particularly in existing equipment.

In U.S. Pat. No. 5,630,590, issued May 20, 1997 to Joseph P. Bouchard and Merrell W. Long entitled "Method and Apparatus for Improving the Air Sealing Effectiveness in a Turbine Engine", a brush seal is disclosed for use in a gas turbine engine. This reference is hereby incorporated in its entirety by reference.

In U.S. Ser. No. 08/892,738, filed Jul. 15, 1997 by Steve Ingistov entitled "Turbine Power Plant Having Minimal-Contact Brush Seal Augmented Labyrinth Seal", Notice of Allowance mailed Apr. 15, 1999, a similar brush seal is disclosed. This application is also incorporated in its entirety by reference.

Both of these references disclose fixed brush seals which are positioned on an end of the inner barrel with suitable spacing from the compressor rotor so that they do not engage existing rotor components. If engagement of the brush seal and the rotor components occurs, the engagement is a result of wobbling of the power shaft connecting the turbine and the compressor, differential expansion of the compressor components and the inner barrel of the machine and the like. As a result, the contact can result in a very high-pressure contact of the brush bristles with the existing rotor components since the bristles are fixed relative to the inner barrel. Accordingly, when contact occurs it can be very forcible, with resulting damage to the rotor components. As a result, clearance space must be provided to attempt to accommodate the worst-case situation. Accordingly, considerable air bypasses the bristles and as a result the use of a labyrinth seal in connection with the bristles is disclosed.

The use of a labyrinth seal in itself entails substantial difficulties with respect to start-up and shut-down operations. These shortcomings are discussed at considerable length in both of the references discussed above.

Since it is desirable, for the reasons discussed above, to control the amount of air passing between the rotor components and the chamber inside the inner barrel, improved sealing methods have been sought.

SUMMARY OF THE INVENTION

A stationary gas turbine engine for a power plant having a floating brush seal and comprising a multistage axial compressor, the compressor having a rotor, the rotor having a cylindrical land region downstream of at least a major portion of the compressor, the land region having an outside diameter; a turbine shaft-coupled to the rotor; a stationary inner barrel member having an end and a cavity positioned in the end of the inner barrel member, the cavity having an inner surface, the inner barrel being downstream of at least a major portion of the compressor, air flowing from the compressor to a combustor passing outside of the inner barrel member, a chamber within the inner barrel member forming a passage for cooling air from the compressor, the cooling air flowing from the chamber and being mixed with combustion gases upstream of the turbine; a floating brush seal for restricting air passage into the chamber from the compressor, the floating brush seal comprising a ring-shaped holder positioned in the cavity; a multiplicity of bristle members extending radially inwardly from the holder toward the land region of the rotor, outer extremities of the bristle members being rigidly retained relative to the holder; a retainer connected to the end of the inner barrel to form an enclosure to contain the holder; and, a plurality of springs mounted between an outside circumference of the holder and the inner surface of the cavity to urge the bristle members into contact with the land region of the rotor.

The present invention further comprises a stationary gas turbine comprising a first rotary compressor component having a rotor having a land region; a non-rotary second component having an end extending over and around at least a portion of the land region and a cavity; a passageway between the end of the second component and the rotor; and, a floating brush seal positioned on the end of the second component to resiliently engage the land region, the floating brush seal comprising a ring-shaped holder positioned in the cavity; a multiplicity of bristle members extending radially inwardly from the holder toward the land region of the rotor, outer extremities of the bristle members being rigidly retained relative to the holder; a retainer connected to the end of the second component to form an enclosure to contain the holder; and, a plurality of springs mounted between an outside circumference of the holder and an inner surface of the cavity to urge the bristle members into contact with the land region of the rotor.

The invention further comprises a method for controlling cooling air flow into a chamber in a stationary inner barrel member in a turbine power plant having a multistage axial compressor, a turbine shaft-coupled to a rotor of the compressor, the rotor having a cylindrical land region, positioned circumferentially relative to the shaft and inside an end of the stationary inner barrel member, the method consisting essentially of positioning a brush seal comprising a ring-shaped holder in a cavity positioned in the end of the stationary inner barrel member; a multiplicity of bristle members extending radially inwardly from the holder toward the land region of the rotor, outer extremities of the bristle members being rigidly retained relative to the holder; a retainer connected to the end of the stationary inner barrel member to form an enclosure to contain the holder; and, a plurality of springs mounted between the holder and an inner surface of the cavity to urge the bristle members into contact with the land region of the rotor; and, providing substantially all of the cooling air flow required in the chamber via at least one flow-controlled passageway in fluid communication with at least one of a compressor outlet and an auxiliary air source and the chamber.

DESCRIPTION OF THE PREFERRED EMBODIMENTS

In the discussion of the FIGS. the same numbers will be used throughout to refer to the same or similar components.

Figure 1:
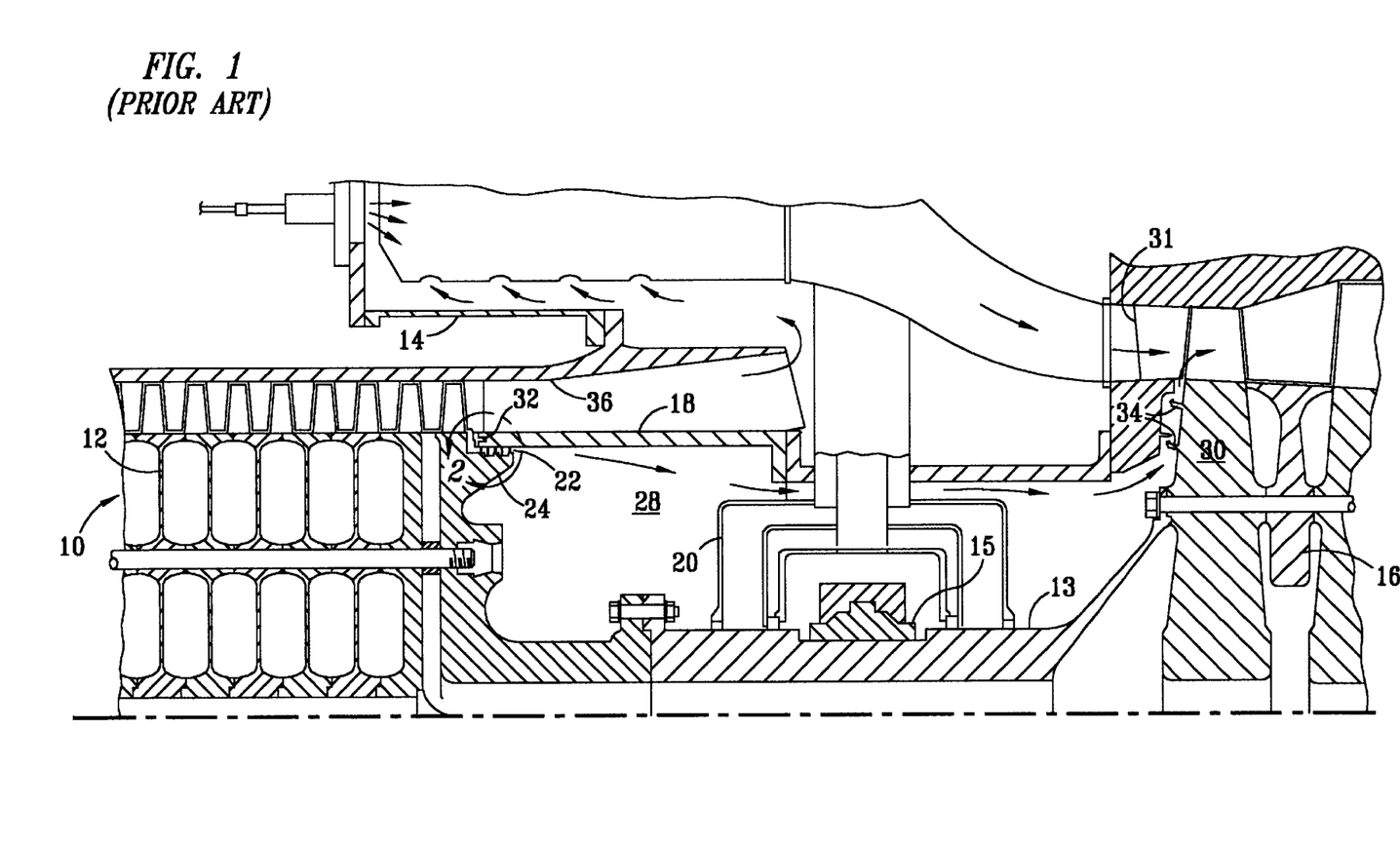
FIG. 1 is a fragmentary sectional elevational view of the prior art stationary turbine power plant machine.
Figure 2:
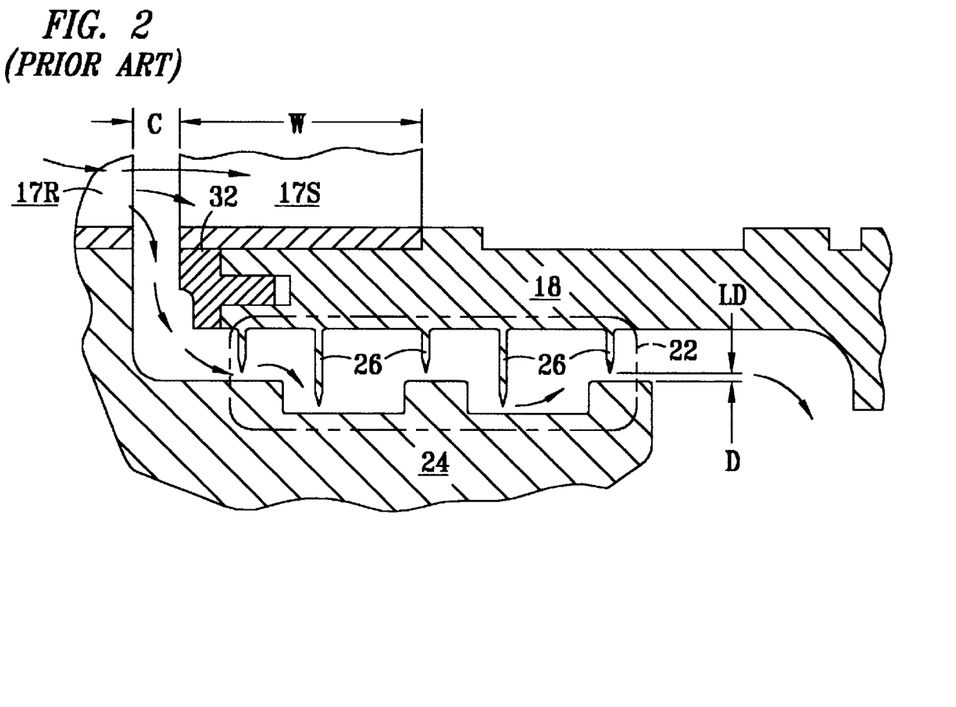
FIG. 2 is a detailed sectional view of the prior art machine of FIG. 1 within region 2 thereof.

A prior art gas turbine machine 10 as disclosed in FIGS. 1–2 has a multi-stage axial compressor 12, a combustor 14, and a turbine 16 that is shaft-coupled to compressor 12 by a shaft 13 at least partially positioned within an inner barrel member 18, a set of rotor bearings 15 being mounted within a bearing housing 20 located within barrel member 18. Compressor 12 has a last or seventeenth stage 17R on a rotor member 24, and an associated stator 17S supportively positioned on inner barrel member 18. A labyrinth seal 22 is located between rotor member 24 and the inner barrel member 18, labyrinth seal 22 including a plurality of stationary knife-edge members 26 projecting inwardly from barrel member 18 toward a series of radially offset cylindrical portions of rotor member 24. A small annular clearance normally exists between each knife-edge member 26 and rotor member 24 as indicated by a radial gap distance LD, the distance LD being made approximately 0.030 inch at manufacture. A chamber 28 is formed within barrel member 18, and is supplied with cooling air from the last stage of compressor 12 by a controlled amount of leakage through labyrinth seal 22. The cooling air, after passing rotor bearing housing 20, flows outwardly in front of a first wheel 30 of turbine 16 and mixes with high-temperature gases passing from combustor 14 through a nozzle block 31. Barrel member 18 can be segmented, being maintained in alignment as known to those skilled in the art, at least partially by an interlocking insert ring 32 that also supports final stator member 17S of compressor 12. Typically, inner barrel member 18 is formed by a pair of semi-circular segments, insert ring 32 being formed in three segments that overlap joints between the segments of the barrel member. Insert ring 32 is axially spaced from a portion of rotor member 24 by a distance C through which the cooling air flows toward labyrinth seal 22, distance C corresponding to a space between rotor 17R and stator 17S, stator 17S also having a width W. Machine 10 under design conditions produces air flow at a pressure of approximately 167 psi gage and a temperature of approximately 675° F. at the exit of compressor 12, the main portion of the flow being between inner barrel member 18 and an outer barrel member 36 that surrounds inner barrel member 18. A radially spaced pair of "angel wings" 34 project forwardly toward compressor 12 from first wheel 30 for controlling cooling air flow from chamber 28 to turbine 16. Chamber 28 within inner barrel member 18 is intended to be maintained at a pressure of approximately 82 psi gage by the flow of cooling air through labyrinth seal 22.

Turbine machine 10, being of the type that is commercially available as Series 7001 heavy duty gas turbine from the previously identified General Electric Corp., has a somewhat protracted start-up sequence that lasts over one hour and a shut-down sequence that lasts approximately one hour as disclosed in U.S. Ser. No. 08/892,738, filed Jul. 15, 1997 entitled "Turbine Power Plant Having Minimal-Contact Brush Seal Augmented Labyrinth Seal", Notice of Allowance mailed Apr. 15, 1999. Typically, there is significant wear of knife edge member 26 against rotor member 24 during portions of the shut-down sequence from the as-manufactured condition, the distance LD rapidly increasing to between approximately 0.070 inch and approximately 0.110 inch. This increased clearance adversely affects performance of machine 10 by lowering the flow of pressurized air into combustor 14 as well as excessively lowering the turbine inlet temperature (by mixing the low temperature stream of compressed cooling air with the stream of hot combustion gases from combustor 14).

Figure 3:
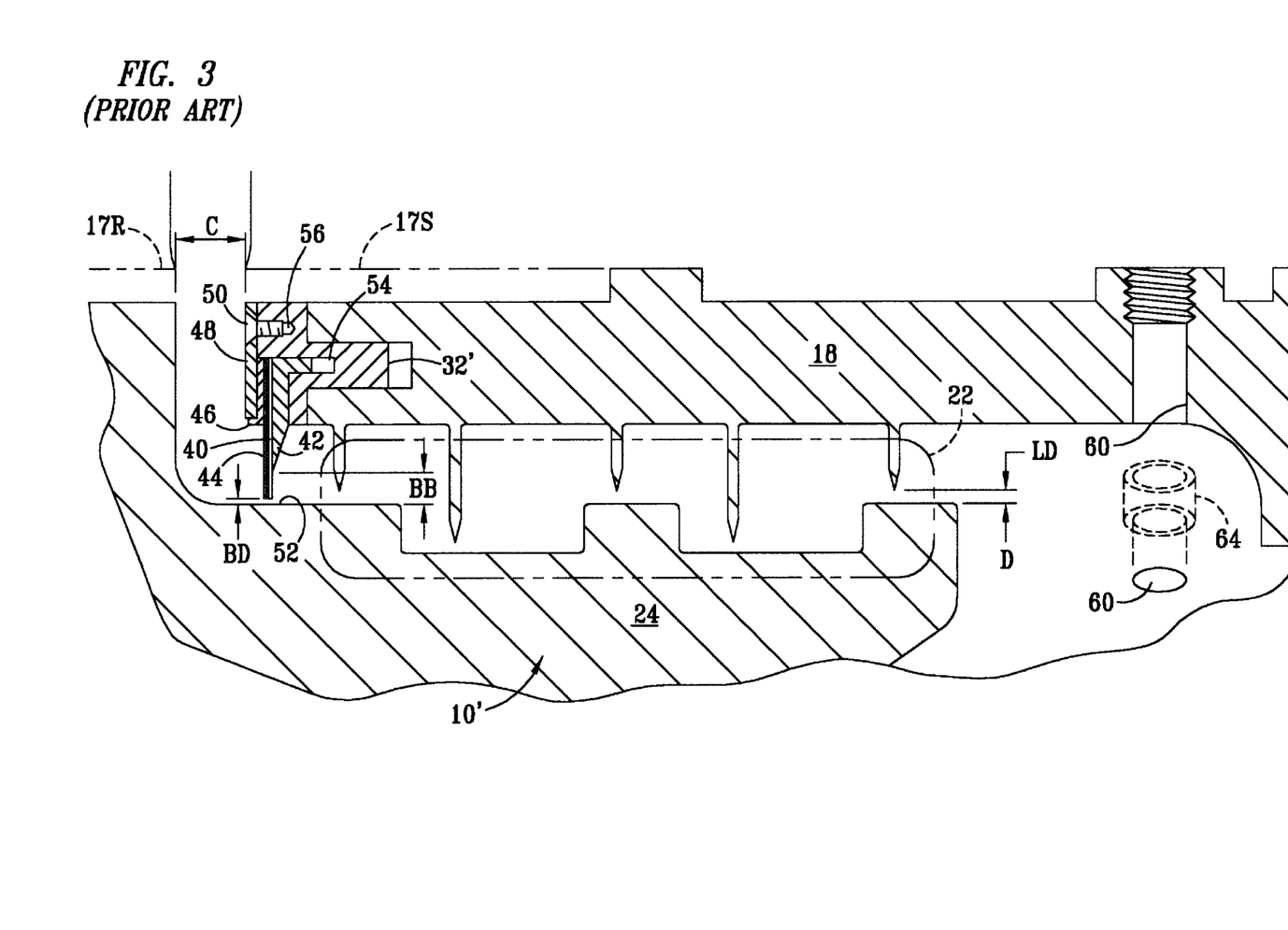
FIG. 3 is a sectional view of the prior art machine of FIG. 1 within region 2 thereof including a prior art brush seal.
Figure 4:
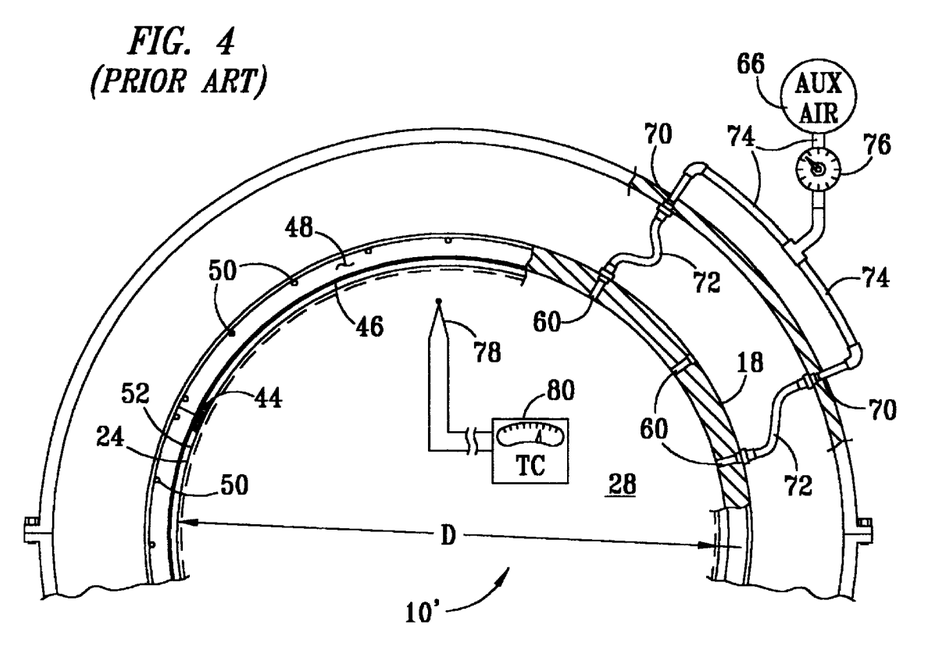
FIG. 4 is a cross-sectional view of the machine shown in FIG. 1 showing a system for supplying air to the chamber in the inner barrel.

As shown in FIGS. 3 and 4, the machine, designated 10', is provided with a brush seal 40 for augmenting labyrinth seal 22. Brush seal 40 includes a backing plate 42, a multiplicity of tightly packed bristle members 44, and a cover plate 46. Bristle members 44 are clamped between backing plate 42 and cover plate 46, outer extremities of the bristle members being positively anchored to plates 42 and 46 by welding or other suitable means. Bristle members 44 are typically very thin, being formed of a high-strength metal alloy, and closely packed at a density of approximately 4,500 per square inch.

In an exemplary configuration of machine 10', a retainer plate 48 holds the brush seal 40 in fixed relation to barrel member 18 by interlocking engagement with a counterpart of the insert ring, designated adapter ring 32', backing plate 42 having a generally L-shaped cross-section, one leg of which axially projects into adapter ring 32'. Retainer plate 48 is fastened to insert ring 32' by a plurality of threaded fasteners 50. In the exemplary configuration of FIG. 3, fasteners 50 are conventional undercut flat head machine screws having a thread diameter of approximately 0.99 inch, being spaced circumferentially not more than 6 inches on center, and staked in place. As further shown in FIG. 3, bristle members 44 are located in spaced relation to a land region 52 of rotor member 24, the land region having a diameter D, bristle members 44 being radially spaced at a distance BD from land region 52. Thus brush seal 40 is fluid-connected in series with the labyrinth seal in a "cold" condition of machine 10' and distance BD is preferably approximately 0.010 inch for preventing unwanted contact between bristle members 44 and rotor member 24. It is contemplated that momentary contact between bristle members 44 and rotor member 24 may occur during the shut-down sequence as explained above, but that no such contact with occur either during the initial portion of the start-up sequence or during steady-state full load operation of machine 10'. It is believed that the preferred avoidance of continuous brush contact is attained when the "cold" clearance (with rotor member 18 stationary) is not less than 0.015 percent of the diameter D. In the case of the "Frame-7 machine", diameter D is approximately 50.5 inches; accordingly, distance BD is preferably not less than 0.00757 inch, being more preferably approximately 0.010 inch. In the "cold" condition, backing plate 42 is radially spaced at a distance BB from rotor member 24, distance BB being sufficiently great for preventing contact with the rotor member, yet sufficiently small for supporting bristle members 44 against upstream air pressure. In the above example, a preferred value for distance BB is approximately 0.170 inch. Backing plate 42 is also tapered inwardly and forwardly for fail-safe limitation of rotor contact in the event of abnormal operating conditions. Under design conditions, clearance distance BD is contemplated to be somewhat less than in the cold condition in which machine 10' is characterized, but not so much less as to create contact. If testing shows otherwise, clearance distance BD is preferably to be made slightly larger.

It has been contemplated that brush seal 40 can be added to existing turbine machines 10 having worn labyrinth seals 22 as described above by modification of insert ring 32. Particularly, adapter ring 32' can be formed by axially shortening existing insert ring 32, forming an annular channel as indicated at 54, and forming threaded openings 56 for fasteners 50. Adapter ring 32' can be segmented as described above in connection with insert ring 32.

It has also been contemplated that brush seal 40 be used in "fresh" installations having no wear of labyrinth seal 22. In such cases, the labyrinth seal radial spacing LD, which is only 0.03 inch, quickly increases as a result of wear during shut-down as described above. Nevertheless, it may be desired to augment the flow of cooling air into chamber 28. Accordingly, and as shown in FIG. 3, barrel member 18 is preferably provided with one or more threaded passages 60. Selected ones of passages 60 may be closed or partially blocked by plugs 62, jets 64, valves 76 or the like.

Also, some or all of passages 60 can be fluid-connected to an auxiliary source 66 of pressure air as shown in FIG. 4. More particularly, outer barrel member 36 of turbine machine 10 is provided with one or more fluid ports 70, an inner conduit 72 being fluid-connected between each port 70 and a corresponding one of threaded passages 60, an outer conduit 74 being fluid-connected between port(s) 70 and the auxiliary source 66 and having adjustable valve 76 series-connected therein for adjustably restricting the flow of auxiliary cooling air into chamber 28 of the inner barrel member. Preferably valve 76 is a calibrated needle valve for facilitating repeatable adjustment thereof in response to a monitored operating parameter of machine 10. The monitored operating parameter can be an inside temperature of inner barrel member 18, which grows to exceed a preferred value if brush seal 40 is excessively effective in restricting the flow of cooling air from compressor 12 into chamber 28. FIG. 4 shows a thermocouple temperature sensor 78 that is normally provided with machine 10 of FIGS. 1–2, sensor 78 having a conventional indicator 80 associated therewith. Manual control of needle valve 76 in response to readings of the indicator is appropriate in that the start-up sequence of the machine is sufficiently slow. Auxiliary source 66 must be maintained at greater pressure than that of chamber 28 for assuring the proper direction of flow. It will be understood that at least a portion of auxiliary source 66 can be provided by compressor 12. Indeed, when any of passages 60 are left open or provided with jets 64, but not the inner and outer conduits 72 and 74, that portion of auxiliary source 66 is the last stage of compressor 12. Also, it may be preferred to take from an earlier stage of compressor 12, or from an independent source, to provide auxiliary source 66 for reasons of greater efficiency and/or reduced cost.

Turbine machine 10' provides improved control of cooling air into chamber 28 for significantly increased output and efficiency in typical large power plant installations. Under conditions presently encountered, it is believed that machine 10 will provide approximately 1.5 megawatts of additional power output from a typical installation of the Frame-7 machine, resulting in a savings on the order of $250,000 per machine, the installation cost being on the order of $30,000.

Figure 5:
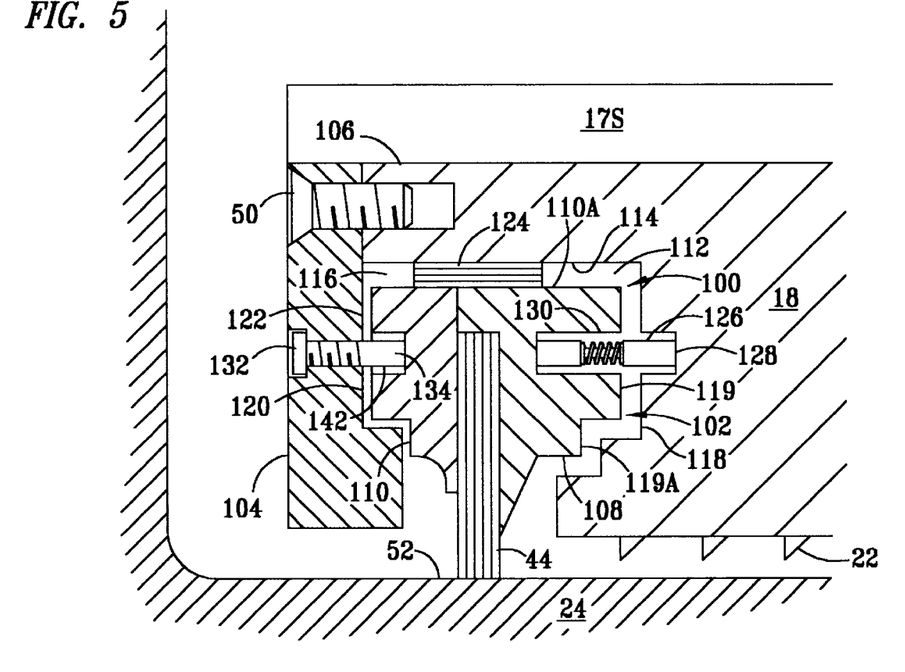
FIG. 5 is a sectional view of a floating seal according to the present invention positioned in an end of the inner barrel prior to machine start-up.

In FIG. 5, an end portion 106 of inner barrel member 18 is shown. As shown in FIG. 1, inner barrel member 18 extends downstream beyond the end of compressor 12. The term "downstream" refers to the airflow direction through machine 10. There is an overlap at rotor 24 and at land region 52. In land region 52 and downstream from land region 52, labyrinth seals are frequently positioned as disclosed in FIGS. 1 and 2 to limit the flow of compressed air into chamber 28 inside inner barrel member 18. Problems with the use of the labyrinth seal have been discussed above. Similarly, the difficulties related to the use of the fixed brush seals as shown in FIG. 3 have also been discussed above. In FIG. 5, a floating brush seal 100 is shown. Floating brush seal 100 comprises a holder 102 which comprises a first member 108 and a second member 110 as shown. The holder can be fabricated by any suitable technique so long as it is effective to retain bristles 44 in a fixed relationship to holder 102. Bristles such as described above are suitable for use in floating brush seal 100. The bristles are rigidly retained relative to holder 102. Holder 102 includes an outer surface 110A which is adapted to contact a plurality of leaf springs 124. Holder 102 is retained in position in a cavity 112 positioned in end 106 of inner barrel 18. A downstream inside surface 118 of cavity 112 is formed to matingly join at least one surface 119 of holder 102. As shown, the downstream end of holder 102 is adapted to join downstream inside surface 118 of cavity 112 at at least two surfaces 119 and 119A for the purpose of creating a tortuous path for the air.

A retainer 104 is positioned on first end 106 of inner barrel 18 by suitable threaded fasteners 50. Retainer 104 is formed to have a retainer cavity 122 in its surface facing holder 102. Retainer cavity 122 and cavity 112 in inner barrel member 18 form an enclosure 116, having an inner surface 114 which contains holder 102 in position on first end 106 of inner barrel 18. Holder 102 retains bristles 44 in position and in contact with land area 52. As shown in FIG. 5, the power generating gas turbine is shut down with holder 102 being biased toward an upstream surface 120 of enclosure 116. Holder 102 is maintained in this position by a plurality of spring-loaded pins 126 which urge holder 102 toward retainer 104. Spring-loaded pins 126 are positioned in a receptacle opening or slot 128 in inner barrel member 18 with the opposite ends of the pins extending into openings 130 in holder 102. Openings 128 are sized to permit space around pins 126. Optionally, opening 128 may be a slot machined around the inside of cavity 112 for ease in installing holder 102. Holder 102 may also be installed in segments, as shown more specifically in FIG. 7.

Holder 102 is maintained in position relative to retainer 104 by a threaded pin 132 which is threaded through at least a portion of retainer 104 with an unthreaded end 142 extending into an opening 134 in the upstream side of holder 102. Preferably, the length of threaded pin 132 is less than the distance C in FIG. 1. Opening 134 could be considered to be a slot since it is machined to provide room for movement of holder 102 about pins 132. Pins 132 are used to prevent rotation of holder 102 relative to inner barrel 18.

Figure 6:
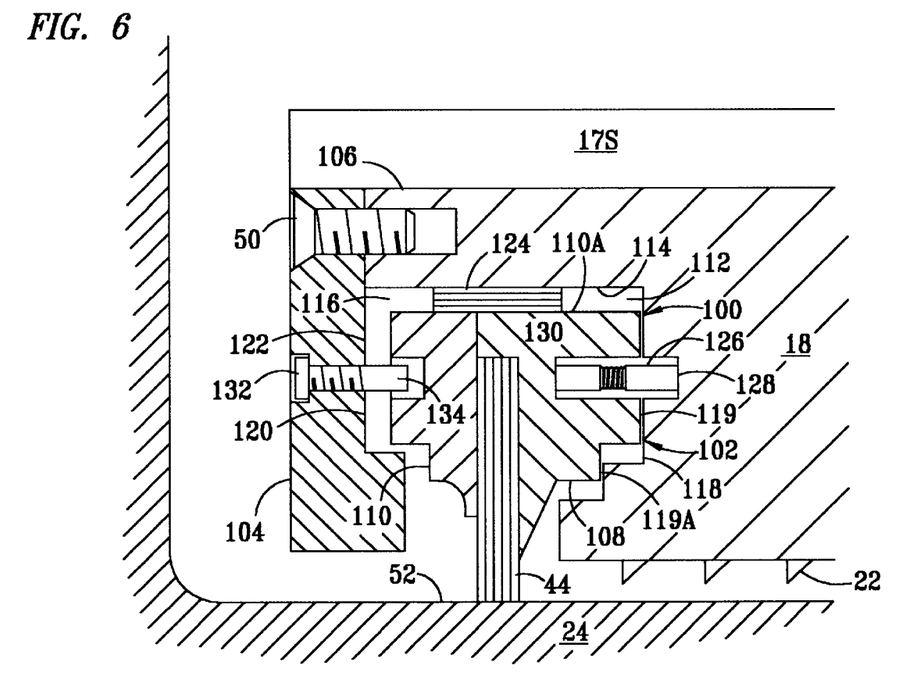
FIG. 6 shows the floating seal of FIG. 5 during machine operation.

In FIG. 6 the same embodiment as in FIG. 5 is shown, but with the machine in operation. With the turbine in operation, holder 102 is positioned as shown in FIG. 6. The pressure of the compressed air against bristles 44 is sufficient to push holder 102 into the position shown in FIG. 6 against a downstream inner surface 118 of the enclosure. In this position, substantially no compressed air flows around holder 102 in enclosure 116.

The bristles 44 are held in engagement with land area 52 by a plurality of springs 124 positioned between outer surface 110A of holder 102 and an outer surface in enclosure 116. These springs are preferably leaf springs of stainless steel or other suitable material which are suitably resistant to the temperatures encountered during operation of the machine. A plurality of pins 126 are shown for maintaining holder 102 in position as shown in FIGS. 5 and 6. Similarly, a plurality of threaded pins 132 slidably and axially (relative to the axis of the holder) permit limited axial movement of holder 102 and prevent rotation of holder 102. Desirably, at least two pins 132 are used for each segment of holder 102.

Figure 7:
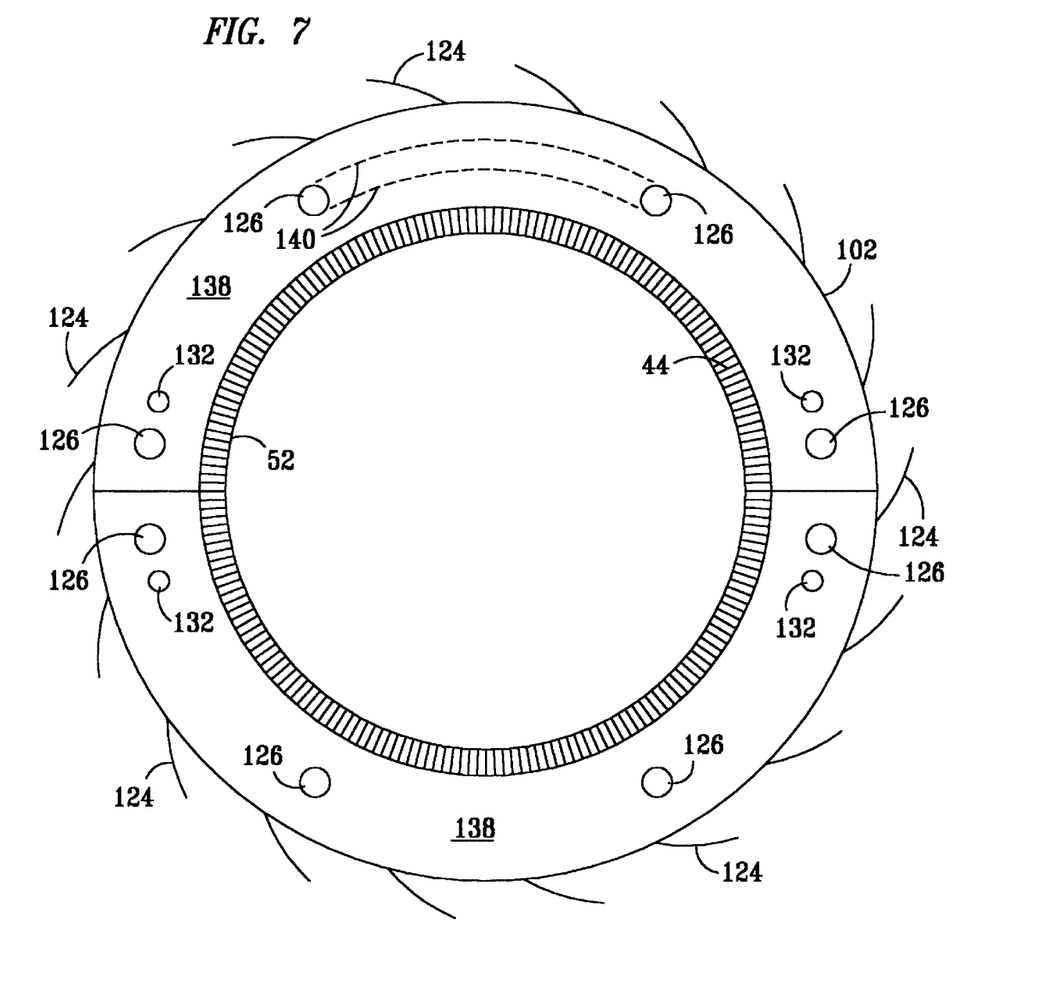
FIG. 7 is a cross-sectional view of the brush seal as installed in an end of the inner barrel member.

In FIG. 7, a cross-sectional view of holder 102 is shown. Holder 102 is shown as two hemispherical segments, a first segment 136 and a second segment 138. Each of the segments includes a plurality of springs 124 which are shown as leaf springs 124 which are positioned on the outside of holder 102. The leaf springs are positioned so that an inward pressure is exerted relatively uniformly about the entire exterior of holder 102. Desirably the springs are of sufficient strength to support the entire weight of holder 102. Segments 136 and 138 are readily installed in cavity 112, as described above. Spring-loaded pins 126 are used to hold holder 102 in position. A plurality of pins is desirably used to retain holder 102 in position. Similarly, threaded pins 132 extending into holder 102 from retainer 104 are shown. Bristles are shown extending inwardly from each of segments 136 and 138. These bristles are shown for convenience in contact with land area 52.

According to the present invention, the holder may be installed in segments and, if desired, space may be left between the ends of the segments to permit thermal expansion, as required. Effectively, however, the brush seals engage land area 52 around its entire circumference so that the flow of air from compressor 14 into chamber 28 is effectively prevented. Labyrinth seals may be used in conjunction with the floating seals of the present invention, but are generally considered to be unnecessary. Such labyrinth seals are shown schematically in FIGS. 5 and 6 by the projections 22. It will be understood, of course, that more than two segments could be used. The bristles supported by holder 102 are conventional bristles suitable for the purpose described above. A variety of materials could be used for the bristles consistent with the materials of construction of land area 52 and other physical requirements for the bristles.

It is readily apparent by a review of FIG. 7 that if land area 52 wobbles or is otherwise deformed as a result of thermal changes in the machine and the like, then continuous brush contact can be maintained on land area 52. It is also noteworthy that, with such movement of land area 52, the pressure with which the bristles are urged against land area 52 remains relatively constant around the entire circumference of land area 52. In other words, holder 102 is free to move in cavity 112 with the pressure maintained on the bristles at any given point, being that exerted by the springs. The weight of holder 102 is not considered to be a significant factor since the springs are of a strength suitable to support the entire holder. This configuration has thus overcome the major inadequacies of the use of fixed brush seals which could be urged into such forceful contact with land area 52 as to damage the bristles, the land area or both, during times of thermal deformation or the like. It should also be apparent that the floating seals of the present invention can be used with a wide variety of rotary members. In other words, the floating seals of the present invention could be used with larger or smaller land areas and could be used with a turbine shaft. Such applications are particularly desirable when a shaft may be extended for a long distance in larger machines with inadequate support in a middle area or the like.

As also shown by dotted lines 140 in FIG. 7, the openings 128 may be formed as a slot 140. A portion of a machined circumferential slot in downstream inside surface 118 of cavity 112 for receiving pins 126, is shown. In one embodiment, the circumferential slot 140 extends around the full circumference of or the full length of the portion of holder 102. The use of the slot facilitates the installation of the sections since pins 126 can be aligned anywhere in the slot since rotation of holder 102 is prevented by pins 132.

By the use of the floating seal of the present invention, the seal is maintained in contact with land surface 52, but at a reduced pressure since the pressure is supplied by springs 124. This is in direct contrast to the use of the fixed seals where any contact is with an unyielding bristle section and an unyielding land section. This unyielding contact with the previously used brushes may result in damage to the land area, to the brushes, or both, and results in less effective control of the air flow past bristles 44. By the use of the present invention, the bristles are maintained in contact with land area 52 under only the pressure of the springs and possibly a portion of the weight of holder 102. The springs as installed are of sufficient strength to support the entire weight of holder 102 so that relatively uniform pressure is applied around the circumference of land area 52. Accordingly, the floating brush seal can be used to substantially eliminate the flow of air past the brush seals, especially as shown in FIG. 6. While slight amounts of air may pass, the flow of air is anticipated to be much less than required to cool chamber 28. Accordingly, the use of a passageway through a wall of inner barrel member 18 and in fluid communication with a compressed air outlet stream from the compressor or an alternate source is used to supply compressed air to chamber 28. In some instances, it may be desirable to use a flow regulating device such as a jet, a plug, a valve or the like to regulate the flow of air through the passageway. Further, a plurality of passageways may be used.

The air may be supplied from an alternate pressurized air source if required. This variation is discussed in U.S. Ser. No. 08/892,738, incorporated above. The use of such variations in combination with the floating seal is desirable since, unlike the previously-disclosed fixed seals, substantially no flow of air past the floating seal is anticipated. Certainly, it is anticipated that the flow of air past the floating seal will be insufficient to cool chamber 28. On balance, this is an advantage because the amount of air required in chamber 28 is desirably adequate to maintain a selected temperature and pressure in chamber 28, but desirably no more since the use of additional quantities of air in chamber 28 is detrimental to the efficiency of the turbine.

By the use of the floating seal of the present invention in a stationary gas turbine, considerable advantages have been achieved. First, reliable contact is maintained between inner barrel member 18 and rotor 24 at a substantially constant pressure. This permits the use of the brush seal to effectively eliminate air flow through the passageway between these components. Further, the use of controlled air injection into chamber 28 permits the use of only the required quantity of air in chamber 28 contributing to increased efficiency of the overall operation. Further, the inefficiencies and equipment damage resulting during start-up and shut-down discussed previously are avoided by the use of the floating brush seal.

The use of the floating brush seals of the present invention is particularly advantageous and achieves significant improvement over the prior art fixed brush seals and the use of the labyrinth when the shaft coupling the turbine and the compressor may wobble or otherwise function abnormally during start-up, shut-down and the like. Such instances may occur when the shaft is relatively long and slender which inherently introduces an increased wobble into the shaft during rotation, where the bearings supporting the shaft may become worn or the like. As discussed previously, the use of the labyrinth or the use of the fixed brush seal results in a requirement for clearances to prevent contact with the rotor. According to the present invention, such fixed component contacts are avoided while still maintaining a more effective seal than was achieved using the prior art equipment.

Having thus described the invention by reference to certain of its preferred embodiments, it is respectfully submitted that the embodiments described above are illustrative rather than limiting in nature and that many variations and modifications are possible within the scope of the present invention. Many such variations and modifications may be considered obvious and desirable by those skilled in the art based upon the foregoing description of preferred embodiments.

I claim:

1. A stationary gas turbine engine for a power plant having a floating brush seal and comprising:
    (a) a multistage axial compressor, the compressor having a rotor, the rotor having a cylindrical land region downstream of at least a major portion of the compressor, the land region having an outside diameter;
    (b) a turbine shaft-coupled to the rotor;
    (c) a stationary inner barrel member having an end and a cavity positioned in the end of the inner barrel member, the cavity having an inner surface, the inner barrel being downstream of at least a major portion of the compressor, air flowing from the compressor to the combustor passing outside of the inner barrel member, a chamber within the inner barrel member forming a passage for cooling air from the compressor, the cooling air flowing from the chamber and being mixed with combustion gases upstream of the turbine;
    (d) a floating brush seal for controlling air passage into the chamber from the compressor, the floating brush seal comprising:
        (i) a ring-shaped holder positioned in the cavity;
        (ii) a multiplicity of bristle members extending radially inwardly from the holder toward the land region of the rotor, outer extremities of the bristle members being rigidly retained relative to the holder;
        (iii) a retainer connected to the end of the inner barrel to form an enclosure to contain the holder; and,
        (iv) a plurality of springs mounted between the outside circumference of the holder and the inner surface of the cavity to urge the bristle members into contact with the land region of the rotor.

2. The engine of claim 1 wherein the retainer contains a retainer cavity configured to retain the holder in the enclosure.

3. The engine of claim 1 wherein the enclosure is configured to permit movement of the brush seal radially relative to the outside diameter of the rotor and axially relative to an axis of the rotor.

4. The engine of claim 3 wherein a plurality of springs are positioned between a downstream surface of the holder and a downstream surface of the cavity to bias the holder toward an upstream position in the enclosure.

5. The engine of claim 3 wherein a plurality of pins are positioned to engage the retainer and axially, relative to an axis of the holder, and slidably engage the holder to prevent rotation of the holder relative to the outer diameter of the rotor.

6. The engine of claim 1 wherein at least one passageway is provided through a wall of the inner barrel member and in fluid communication with a compressed air outlet stream from the compressor.

7. The engine of claim 6 wherein flow through the passageway is controlled by an air flow regulating device.

8. The engine of claim 7 wherein the air flow regulating device is a jet, a plug or a valve.

9. The engine of claim 1, further comprising means for selectively providing a flow of cooling air into the chamber, comprising:
    (a) a passage extending through one wall of the inner barrel;
    (b) means for connecting the passage to an auxiliary source of pressurized air external of the inner barrel and at a pressure greater than the pressure in the chamber, whereby the pressurized air flows into the chamber; and
    (c) a flow control device for controlling the flow of pressurized air into the chamber.

10. The engine of claim 1, wherein the brush seal is segmented for facilitating assembly in the cavity.

11. A stationary gas turbine comprising:
    (a) a first rotary compressor component having a rotor having a land region;
    (b) a non-rotary second component having an end extending over and around at least a portion of the land region and a cavity;

(c) a passageway between the end of the second component and the rotor; and,
(d) a floating brush seal positioned on the end of the second component to resiliently engage the land region, the floating brush seal comprising
  (i) a ring-shaped holder positioned in the cavity;
  (ii) a multiplicity of bristle members extending radially inwardly from the holder toward the land region of the rotor, outer extremities of the bristle members being rigidly retained relative to the holder;
  (iii) a retainer connected to the end of the second component to form an enclosure to contain the holder; and,
  (iv) a plurality of springs mounted between the outside circumference of the holder and an inner surface of the cavity to urge the bristle members into contact with the land region of the rotor.

12. The engine of claim 11 wherein the retainer contains a retainer cavity configured to retain the holder in the enclosure.

13. The engine of claim 11 wherein the enclosure is configured to permit movement of the brush seal radially relative to the outside diameter of the rotor and axially relative to an axis of the rotor.

14. The engine of claim 13 wherein a plurality of springs are positioned between a downstream surface of the holder and a downstream surface of the cavity to bias the holder toward an upstream position in the enclosure.

15. The engine of claim 13 wherein a plurality of pins are positioned to engage the retainer and axially, relative to an axis of the rotor, slidably engage the holder to prevent rotation of the holder relative to the outer diameter of the rotor.

16. The engine of claim 11 wherein at least one passageway is provided through a wall of the inner barrel member and in fluid communication with a compressed air outlet stream from the compressor.

17. The engine of claim 16 wherein flow through the passageway is controlled by an air flow regulating device.

18. The engine of claim 17 wherein the air flow regulating device is a jet, a plug or a valve.

19. The engine of claim 11, further comprising means for selectively providing a flow of cooling air into the chamber, comprising:
  (a) a passage extending through one wall of the inner barrel;
  (b) means for connecting the passage to an auxiliary source of pressurized air external of the inner barrel and at a pressure greater than the pressure in the chamber, whereby the pressurized air flows into the chamber; and
  (c) a flow control device for controlling a flow of pressurized air into the chamber.

20. The engine of claim 11, wherein the brush seal is segmented for facilitating assembly in the cavity.

21. A method for controlling cooling air flow into a chamber in a stationary inner barrel member in a turbine power plant having a multi-stage axial compressor, a turbine shaft-coupled to a rotor of the compressor, the rotor having a cylindrical land region, positioned circumferentially relative to the shaft and inside an end of the stationary inner barrel member, the method consisting essentially of:
  (a) positioning a brush seal comprising:
    (i) a ring-shaped holder positioned in a cavity in the end of the stationary inner barrel member;
    (ii) a multiplicity of bristle members extending radially inwardly from the holder toward the land region of the rotor, outer extremities of the bristle members being rigidly retained relative to the holder;
    (iii) a retainer connected to the end of the stationary inner barrel member to form an enclosure to contain the holder; and,
    (iv) a plurality of springs mounted between the holder and the inner surface of the cavity to urge the bristle members into contact with the land region of the rotor; and,
  (b) providing substantially all of the cooling air flow required in a chamber via at least one flow-controlled passageway in fluid communication with at least one of a compressor outlet and an auxiliary air source and the chamber.

* * * * *